H. U. UPJOHN.
Devices for Compressing Rubbers in Thill-Couplings.

No. 198,759. Patented Jan. 1, 1878.

Witnesses
O F Coleman
Millie R. Upjohn

Inventor
Henry U. Upjohn ly designed.

UNITED STATES PATENT OFFICE.

HENRY U. UPJOHN, OF KALAMAZOO, MICHIGAN.

IMPROVEMENT IN DEVICES FOR COMPRESSING RUBBERS IN THILL-COUPLINGS.

Specification forming part of Letters Patent No. 198,759, dated January 1, 1878; application filed February 28, 1877.

*To all whom it may concern:*

Be it known that I, HENRY U. UPJOHN, of Kalamazoo, in the county of Kalamazoo and State of Michigan, have invented a new and useful implement to facilitate the compression of shaft-coupling rubbers or anti-rattlers while the coupling-bolt is being inserted. It may be designated as a "rubber-jack" or "shaft-coupling fulcrum."

The invention is fully set forth in the following specification, reference being had to the accompanying drawings.

The object of my invention is to furnish a fulcrum, $a\ a$, (that may be conveniently attached to the ordinary shaft-couplings of light vehicles,) over which the shaft or thill $b$ may be used as a lever to easily compress the rubber $c$ (as shown in the sectional view, Figure 2, of the accompanying drawings,) while the coupling pin or bolt is being inserted.

Figure 1:
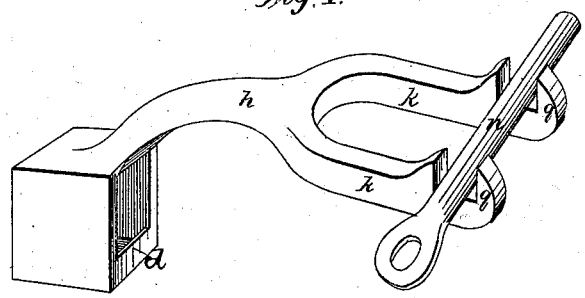

The implement is illustrated separate from the parts to which it is attached while being operated in perspective view, Fig. 1. It has a form which adapts it to the uses and supplies the place of a common buggy-wrench, for removing and tightening nuts, aside from that of a rubber-jack, for which it is especially designed.

Figure 2:
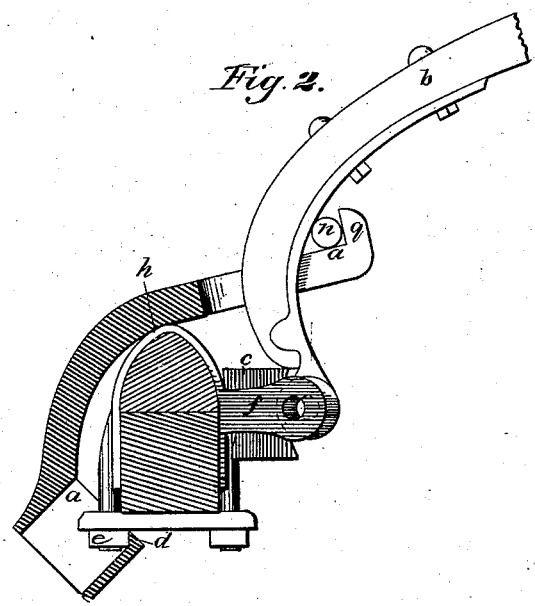

Fig. 2 is a sectional view, in which the parts of a vehicle to which the fulcrum is attached while being operated is shown.

The jack or fulcrum is so formed that the lip or flange $d$ will securely catch against the front surface of the rear nut $e$ of the draw-clip $f f$, while the central portion of the jack bears firmly over the clip and axle at $h$, with the arms $k\ k$ extending forward, so the shaft $b$ will be embraced by them, the fulcrum rod or bolt $n$ being removed until the curved portion of the shaft is sufficiently thrown back to admit of its being received forward of the shaft, against the jaws $q\ q$ on the extremity of the arms $k\ k$, when the shaft $b$ may be used as a lever to compress the rubber spring or anti-rattler $c$ sufficiently to admit the coupling-bolt.

What I claim is—

The wrench $a$, having arms $k$, with recesses $q$, in combination with pin $n$, or its equivalent, on which to rest as a fulcrum the shaft $b$, to compress the rubber spring $c$, substantially as described.

HENRY U. UPJOHN.

Witnesses:
O. F. COLEMAN,
MILLIE K. UPJOHN.